United States Patent
Dendy et al.

[15] 3,654,443
[45] Apr. 4, 1972

[54] ANGLE-OF-ATTACK COMPUTER

[72] Inventors: Joe B. Dendy; Kent G. Transier, both of Phoenix, Ariz.

[73] Assignee: Sperry Rand Corporation, Great Neck, N.Y.

[22] Filed: Nov. 3, 1969

[21] Appl. No.: 873,287

[52] U.S. Cl. ........................... 235/150.2, 73/178 R, 235/197
[51] Int. Cl. ........................................ G06g 7/78, G06g 7/32
[58] Field of Search .................... 235/150.2, 150.22, 150.26, 235/151.33; 244/77 D, 79; 340/52, 73, 262, 178; 73/178 R; 346/8

[56] References Cited

UNITED STATES PATENTS

| 3,082,622 | 3/1963 | Andrew | 244/77 X |
| 3,094,300 | 6/1963 | Osder | 244/77 |
| 3,100,612 | 8/1963 | Owen | 244/77 |
| 3,251,982 | 5/1966 | Kemmer et al. | 235/150.2 |
| 3,262,311 | 7/1966 | Gwathmey | 235/150.22 UX |
| 3,275,269 | 9/1966 | Yiotis | 235/ 150.2 UX |
| 3,379,396 | 4/1968 | Patterson | 244/77 |
| 3,486,722 | 12/1969 | Greene | 235/150.2 UX |

FOREIGN PATENTS OR APPLICATIONS 815,137    6/1959    Great Britain ..................... 235/150.2

Primary Examiner—Malcolm A. Morrison
Assistant Examiner—Jerry Smith
Attorney—S. C. Yeaton

[57] ABSTRACT

An angle-of-attack computer using closed loop computation techniques wherein various on-board sensor outputs are combined to determine a first or initial measure of angle-of-attack which is then used to derive a measure of the mass of the vehicle, which mass measure is then used to determine true airframe angle-of-attack.

13 Claims, 3 Drawing Figures

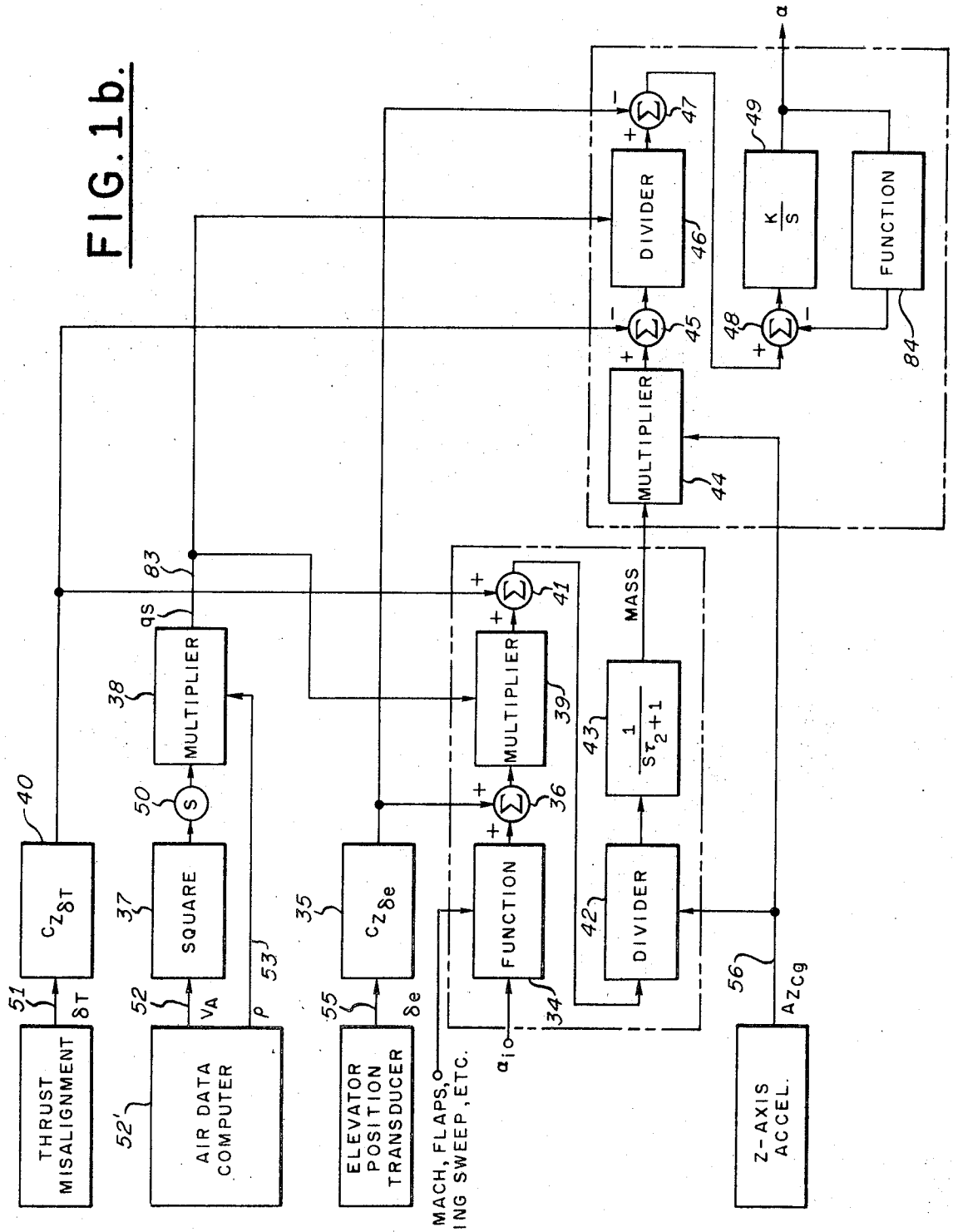

ANGLE-OF-ATTACK COMPUTER

BACKGROUND OF THE INVENTION

True airframe angle-of-attack ($\alpha$) finds many applications as an input to the many sophisticated systems employed in controlling or directing the latest generation of aircraft. It has been used for weapons guidance computation, stability augmentation functions, speed command, stall warning, and gust alleviation. This multiple of uses requires an accurate, reliable measure of this important parameter.

Externally mounted angle-of-attack transducers have had a rather poor history of reliability and accuracy. To be effective, the device must be mounted in the free airstream to minimize fuselage flow effects. This necessarily exposes the transducer to all the severe environmental conditions experienced by the aircraft. Human error has also made a considerable contribution to externally mounted angle-of-attack transducer unreliability. Most mounting positions have made the transducer a convenient handle or step for ground crews and pilots.

The inaccuracies exhibited by vanes and probes can be attributed to the extreme range of environment over which operation is required and to static errors due to the mounting position. Sophisticated approaches to solving these problems have produced some useful results, but at considerable expense.

The major drawbacks of externally mounted transducers can be overcome by computing angle-of-attack from combinations of information derived from internally mounted sensors. While the concept of computed angle-of-attack is not a new one, the implementation of the concept has not been practical, suffering inaccuracies due to inadequate computation techniques and insufficiently accurate sources of primary data, such as aircraft mass.

SUMMARY OF THE INVENTION

True airframe angle-of-attack or angle-of-attack of the fuselage reference line is generated by combining the outputs of several on-board sensors in a computer. Two alternate methods may be used in the overall computation. The first method combines measures of aircraft accelerations along the three body axes along with measures of aircraft velocity, altitude rate, and sideslip angle to first compute inertial measure of angle-of-attack ($\alpha_i$) which is then used to compute vehicle mass using an equation describing the forces in the Z-body axis direction. This computed mass is then used in the latter equation to solve for true airframe angle-of-attack.

The second method uses Euler angle measurements along with velocity, velocity rate, altitude rate, and sideslip angle to compute mass. The final angle-of-attack computation is thereafter identical to the first method.

BRIEF DESCRIPTION OF THE DRAWINGS

Preferred embodiments of the angle-of-attack computer of the present invention are schematically illustrated in the attached drawings, wherein:

FIGS. 1A and 1B taken together constitutes the complete angle-of-attack computer constructed in accordance with the present teachings wherein FIG. 1A constitutes the computer apparatus which derives an initial angle-of-attack measure and FIG. 1B the computer apparatus which derives a measure of aircraft mass and the final or true measure of angle-of-attack, and FIG. 2 schematically illustrates an alternative computer apparatus for deriving the initial angle-of-attack measure.

DETAILED DESCRIPTION OF PREFERRED EMBODIMENT

Figure 1A:
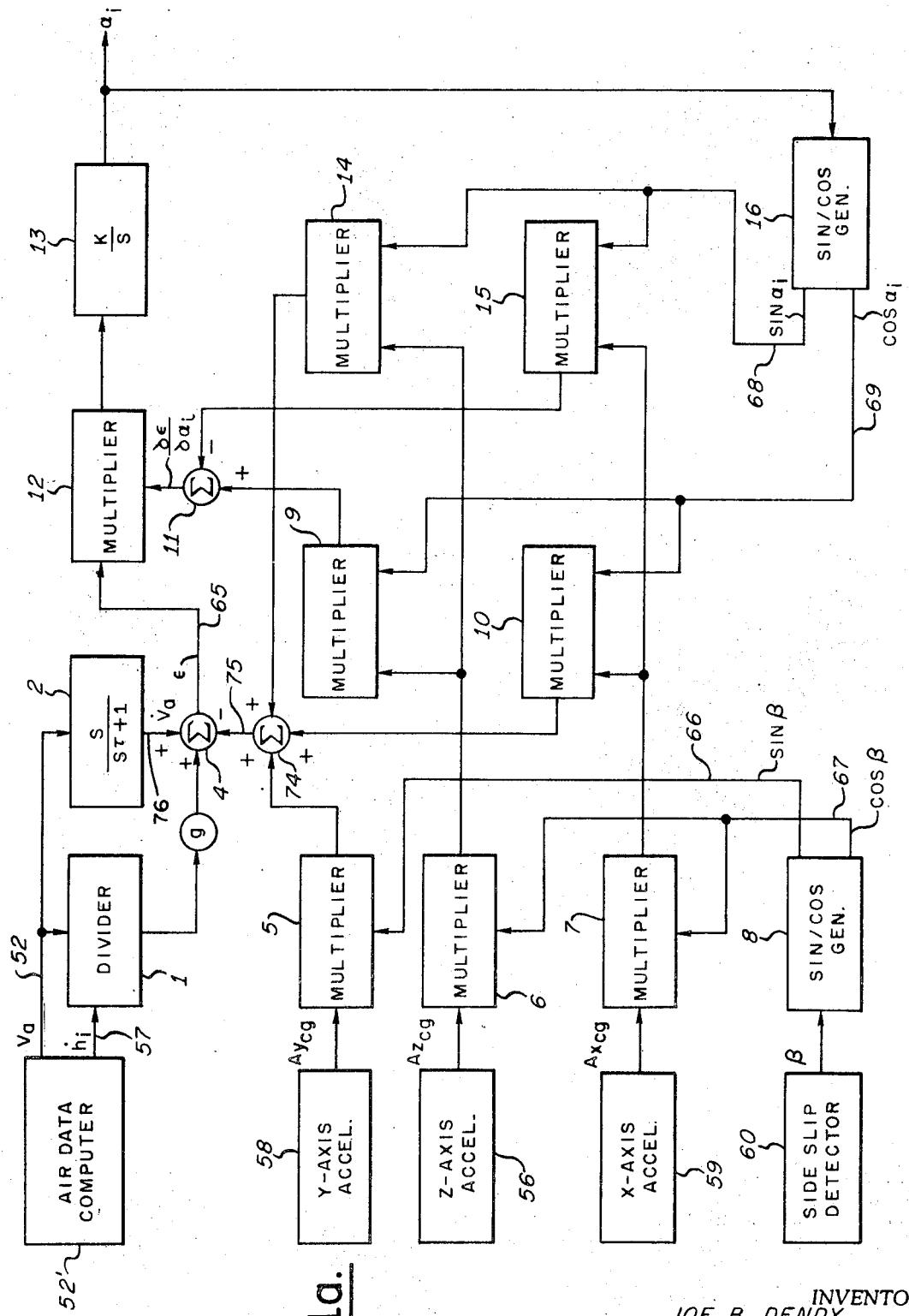

The following list of conventional aircraft aerodynamic equations is used as a basis for the derivation of the equations used in the computation of angle-of-attack in accordance with the teachings of the present invention:

$$U = V_i \cos \beta_i \cos \alpha_i \quad (1)$$
$$V = V_i \sin \beta_i \quad (2)$$
$$W = V_i \cos \beta_i \sin \alpha_i \quad (3)$$
$$V_i \dot{V}_i = \dot{U} U + \dot{V} V + \dot{W} W \quad (4)$$
$$\dot{h}_i = U \sin \theta - V \cos \theta \sin \phi - W \cos \theta \cos \phi \quad (5)$$
$$Ax_{cg} = \dot{U} + QW - RV + g \sin \theta \quad (6)$$
$$Ay_{cg} = \dot{V} + RU - PW - g \cos \theta \sin \phi \quad (7)$$
$$Az_{cg} = \dot{W} + PV - QU - g \cos \theta \cos \phi \quad (8)$$
$$m\, Az_{cg} = q s [C_z(\alpha) + C_{z_{\delta_e}} \delta_e] + C_{z_{\delta_T}} \delta_T \quad (9)$$

Definitions:
- $\beta_i$—inertial sideslip angle
- $\alpha_i$—inertial angle-of-attack
- $U, V, W$—vehicle inertial velocities in the X, Y and Z body axes directions, respectively
- $\dot{h}_i$—vehicle inertial altitude rate
- $\theta$—angle between the vehicle X body axis and the local horizontal
- $\phi$—angle between the vehicle Y body axis and the local horizontal as measured in the Y-Z plane.
- $Ax_{cg}, Ay_{cg}, Az_{cg}$—Accelerations of the vehicle at the center of gravity as measured along the X, Y, and Z axes, respectively.
- $P, Q, R$—vehicle rotational rates about the X, Y and Z axes respectively
- $g$—gravity vector
- $q$—dynamic pressure equal to $\frac{1}{2}\rho V_a^2$ where $\rho$ is local pressure and $V_a$ is air mass related vehicle velocity
- $S$—vehicle wing area
- $m$—vehicle mass
- $C_z(\alpha)$—Z axis stability derivative with respect to angle-of-attack
- $C_{z_{\delta_e}}$—Z axis stability derivative with respect to elevator position
- $C_{z_{\delta_T}}$—Z axis thrust misalignment constant
- $\delta_e$—elevator position
- $\delta_T$—thrust
- $\alpha$—air mass related angle-of-attack Equations (1), (2), and (3) are substituted in equation (5) to produce:

$$\dot{h}_i = V_i (\cos \beta_i \cos \alpha_i \sin \theta - \sin \beta_i \cos \theta \sin \phi - \cos \beta_i \sin \alpha_i \cos \theta \cos \phi) \quad (10)$$

This equation is solved implicity for $\alpha_i$ using measurements of $\dot{h}_i$, $V_a$, $\theta$, and $\beta_i$ where $V_i$ and $\beta_i$ are replaced by their air mass related values, $\beta$ and $V_a$.

The result of equation (10) along with measurements of $Az_{cg}$, $q$, $\delta_e$, and $\delta_T$ and knowledge of $S$, $C_z(\alpha)$, $C_{z_{\delta_e}}$, and $C_{z_{\delta_T}}$ are used in equation (9) to solve for vehicle mass. The mass computation is heavily low pass filtered and reinserted in equation (9) to solve for true angle-of-attack ($\alpha$).

An alternate to equation (10) can be used to solve for inertial angle of attack as follows:

Multiply equation (6) by $U$, (7) by $V$, and (8) by $W$ and then sum to yield:

$$UAx_{cg} + VAy_{cg} + WAz_{cg} = \dot{U}U + QWU - RVU + Ug \sin \theta + \dot{V}V + RUV - PWV - Vg \cos \theta \sin \phi + \dot{W}W + PVW - QUW - Wg \cos \theta \cos \phi \quad (11)$$

The terms involving $P$, $Q$, and $R$ cancel leaving $$UAx_{cg} + VAy_{cg} + WAz_{cg} = \dot{U}U + \dot{V}V + \dot{W}W + g(U \sin \theta - V \cos \theta \sin \phi - W \cos \theta \cos \phi) \quad (12)$$

The first three terms in the right hand side of equation (12) are equivalent to equation (4) and the term in parentheses is seen to be equation (5), thus $$UAx_{cg} + VAy_{cg} + WAz_{cg} = V_i \dot{V}_i + g\, \dot{h}_i \quad (13)$$

Substituting equations (1), (2), and (3) results in $$Ax_{cg} \cos \beta_i \cos \alpha_i + Ay_{cg} \sin \beta_i + Az_{cg} \cos \beta_i \sin \alpha_i = \dot{V}_i + g\, \dot{h}_i/V_i \quad (14)$$

Equation (14) can be solved implicitly for $\alpha_i$ using measurements of $\beta_i$, $Ax_{cg}$, $Ay_{cg}$, $Az_{cg}$, $\dot{V}_a$, $V_a$, and $\dot{h}_i$. The two possible solutions for $\alpha$ then involve simultaneous solution of either equations (9) and (10) or (9) and (14).

A preferred embodiment of the angle-of-attack computer of the present invention is illustrated in FIGS. 1A and 1B and includes basic in-board sensor apparatus responsive to the primary input parameters required for the solution of equation (14). Signals proportional to the linear acceleration of the aircraft along its primary longitudinal, lateral, and vertical axes are provided by X-axis, Y-axis and Z-axis accelerometers 59, 58 and 56 respectively. These may be of conventional configuration and of the type shown in applicants assignee's U.S. Pat. No. 3,190,128. Signals proportional to airspeed $V_a$ and vertical velocity $h_i$ may be derived from a conventional air data computer 52'. A signal proportional to sideslip may be provided by a sideslip detector 60 such as a vane (mounted for example on the top of the fuselage) or from a computation involving the lateral accelerometer and the relationship $Ay_{cg} = (Gy_\beta\beta + Cy_{\delta_r}\delta r) qs/m$ where $Cy_\beta \beta$ is the aircraft stability derivative with respect to sideslip angle and $Cy_{\delta_r} \delta r$ is the aircraft stability derivative with respect to rudder deflection.

It should be understood that the computations described in the following may be performed by either analog techniques or by digital techniques, the block diagrams being employed herein as illustrative of the computational functions or steps required. In practice, digital techniques would be preferred in order to derive $\alpha$ with a high degree of accuracy.

The computer of FIG. 1A makes use of equation (14) to derive the error signal $\epsilon$ on lead 65 proportional to $$\epsilon = g(h_i/V_a) + \dot{V}_a - Ax_{cg} \cos \beta \cos \alpha_i - Ay_{cg} \sin \beta - Az_{cg} \cos \beta \sin \alpha_i$$

using a feedback technique wherein $\epsilon$ is applied to a multiplier 12 and integrator 13 to derive an output $\alpha_i$ as an output and as a feedback signal. The $\beta$ signal from detector 60 is applied as an input to a conventional sin/cos generator 8 producing $\sin \beta$ on leads 66 and $\cos \beta$ on lead 67. For example, if angle $\beta$ is analog and in three wire synchro format, Scott T transformations may be used to derive the sin/cos function. Body mounted accelerometer 58 provides a measure of lateral acceleration which is multiplied by $\sin \beta$ on lead 66 in multiplier 5, yielding $Ay_{cg} \sin \beta$, which is applied as an input to summing network 74. If analog computations are employed, the multipliers and dividers may employ conventional quarter square multiplier techniques well known to those versed in analog computer technology.

Body mounted accelerometer 59 provides a measure of longitudinal acceleration which is similarly multiplied by $\cos \beta$ in multiplier 7. A feedback of signal $\alpha_i$ to sin/cos generator 16 provides measures of $\sin \alpha_i$ on lead 68 and $\cos \alpha_i$ on lead 69. The $\cos \alpha_i$ term is applied to multiplier 10 which is also responsive to the output of multiplier 7 yielding as an output a signal proportional to $Ax_{cg} \cos \beta \cos \alpha_i$. This signal is applied to summer 74.

Body mounted accelerometer 56 provides a measure of vertical acceleration 56 which is multiplied by $\cos \beta$ on lead 67 in multiplier 6, the result of which is multiplied by $\sin \alpha_i$ in multiplier 14 yielding $Az_{cg} \cos \beta \sin \alpha_i$ which is supplied to summer 74. Thus, the output of summer 74 constitutes a signal representing the left hand side of equation (14): $Ax_{cg} \cos \beta \cos \alpha_i + Ay_{cg} \sin \beta + Az_{cg} \cos \beta \sin \alpha_i$. A signal proportional to inertial altitude rate is provided from the altitude channel of air data computer 52' and in accordance with equation (14) is divided by a signal proportional to true airspeed 52 from the airspeed channel 52 of air data system 52' by means of divider 1. The output of divider 1 is suitably scaled by the gravity constant $g$ resulting in the term $g\, h_i/V_a$ which is supplied to a second summing junction 4. The true airspeed signal on lead 52 is also supplied to a rate taker or high pass filter 2 whose output over the passband of the filter is a signal proportional to airspeed rate $\dot{V}_a$ on lead 76. This acceleration term is summed in summer 4 with the signal from divider 1 from which the output from summer 75 is subtracted whereby to derive the error signal $\epsilon$ on lead 65 as given above. It will be understood that the summing devices 4, 74 and 11 may be simple summing junctions or conventional summing amplifiers in the analog computer implementation.

Closed loop implicit computation of course requires that the feedback be negative or degenerative to ensure system stability. In the present embodiment this is accomplished by multiplying the error signal $\epsilon$ by the derivative of the error signal with respect to the computed quantity ($\alpha_i$). In the case of the computer of FIG. 1A this derivative is given by:

$$(\partial \epsilon / \partial \alpha_i) = Ax_{cg} \cos \beta \sin \alpha_i - Az_{cg} \cos \beta \cos \alpha_i$$

This error derivative signal is provided by the remaining multipliers 9 and 15 and summer 11 the output of which is multiplied by $\epsilon$ in multiplier 12. Thus, the output of multiplier 15 which provides a signal proportional to the product of a signal $\sin \alpha_i$ from sin/cos generator 16 and $Ax_{cg} \cos \beta$ from multiplier 7 is supplied as a negative input to summer 11 while the output of multiplier 9 providing a signal proportional to the product of $\cos \alpha_i$ from sin/cos generator 16 and $Az_{cg} \cos \beta$ from multiplier 6 is supplied as a positive input to summer 11 whereby to provide the desired stabilizing derivative.

The output of multiplier 12, $(\partial \epsilon / \partial \alpha_i)\epsilon$, is integrated in a conventional integrator network 13 the output of which is therefore a signal proportional to the desired measure of inertial angle-of-attack $\alpha_i$. This output then provides the feedback signal to sin/cos generator 16 as set forth above.

Thus, FIG. 1A provides a good long term measure of craft angle-of-attack $\alpha_i$ based on inertial measures of craft accelerations along the craft X, Y and Z axes, including the effects of the gravity constant thereon, together with a measure of the direction of the relative wind, craft velocity and velocity or airspeed rate. This measure is derived without the use of a long term gyroscopic reference such as a vertical gyro and hence is devoid of long term drift and erection errors due to craft accelerations normally inherent in such devices. However, it is desired to provide an accurate and instantaneous measure of angle-of-attack, especially in the presence of turbulence. This instantaneous $\alpha$ measure is important especially in missile delivery systems and systems where ground based targets are concerned, including non-military targets such as a landing runway. The short term components of $\alpha$ are ultimately included in the final measure of $\alpha$ by means of the computation preferred in the computer section illustrated in block diagram in FIG. 1B.

In general, and as pointed out above, equation (9) which is the Z-force equation of motion of the aircraft, provides an accurate measure of craft instantaneous angle-of-attack, provided a measure of craft mass is available. Such measure is not normally readily available since known systems (based for example on initial weight, fuel burn-off and removal of stores) for determining craft mass are not sufficiently accurate. However, in accordance with the teachings of the present invention, the inertial measure of angle of attack $\alpha_i$ although in itself not optimum as the final measure of $\alpha$, is sufficient to derive a very accurate measure of craft mass, $m$, using the relationships set forth in equation (9) since aircraft mass changes very slowly. Since the mass of the aircraft does change slowly, the signal proportional to mass is heavily filtered which in turn also removes any undesirable perturbations and noise from all of the terms used in the computation of mass. Having an accurate value of mass from a solution of equation (9) for mass, this equation is re-solved for $\alpha$, which solution provides a very accurate and final measure of the airframe angle-of-attack $\alpha$ over the entire flight regime of the aircraft.

In accordance with the teachings of the present invention, the inertial angle-of-attack output, $\alpha_i$, derived by the computer of FIG. 1A is used in the ensuing calculation of true angle-of-attack of the aircraft.

Referring now to FIG. 1B inertial $\alpha_i$ from the computer of FIG. 1A is supplied to a function generator 34 the output of which is the $C_z(\alpha_i)$ stability derivative. The function generator 34 supplies a signal which is a function of change in the lift characteristic of the wing, i.e., changes in aircraft wing geometry such as flap extension, and by changes in mach number. The $C_z(\alpha_i)$ signal is summed with the $C_{z_{\delta_e}}\delta e$ term which is generated by scaling the elevator position transducer output 55 by the $C_{z_{\delta_e}}$ stability derivative of the aircraft by scaler 35. The summer output 36 is multiplied by $qS$ from lead 83 at multiplier 39. The $qS$ term is generated by squaring the air data system output $Va$ 52 at squaring circuit 37 scaling by $S$ at 50 and multiplying by air data system output $\rho$ on lead 53 at multiplier 38. The output signal of multiplier 39 is proportional to $(C_z(\alpha_i) + C_{z_{\delta_e}}\delta e)qS)$ and is summed with a signal representing the thrust misalignment term $C_{z_{\delta_t}} \delta t$ at summer 41. $C_{z_{\delta_t}} \delta t$ is generated by scaling thrust output transducer signal 51 by $C_{z_{\delta_t}}$ 40. Normally the effect of this term on the Z force equation is very small and in many applications may be eliminated. Summer 41 output signal is divided at divider 42 by a signal from the vertical accelerometer signal 56 to form $[qs(C_z(\alpha_i) + C_{z_{\delta_{e}}} \delta e] + C_{z_{\delta_t}} \delta t)$ which is the first solution of equation (9) for the mass term. The output of divider 42 is passed through a heavy or long time constant, low pass filter 43, whereby to provide an accurate measure of aircraft mass.

In accordance with the present teachings the mass signal is now used in a further solution of equation (9), this time for the $\alpha$ term. For this purpose the mass signal is multiplied by the vertical accelerometer signal $Az_{cg}$ 56 at multiplier 44 from which the thrust misalignment term is subtracted at summer 45. The output of summer 45 is divided by $qS$ at divider 46 resulting in a signal proportional to $(mAz_{cg} = C_{z_{\delta_t}} \delta t/qS)$. The $C_{z_{\delta_e}} \delta e$ term is subtracted from the divider output at summer 47 which results in the equation (9) solution for $C_z(\alpha)$. This $C_z(\alpha)$ term is used as the input to a closed loop angle-of-attack generator consisting of an integrator 49 and the function generator 84 which is the same as function generator 34. The function generator 84 output is subtracted from $C_z(\alpha)$ output of summer 47 at summer 48 to form an error signal for the integrator 49 input. Thus, the output of integrator 49 is a signal which is a measure of the desired instantaneous angle-of-attack of the aircraft.

Figure 2:
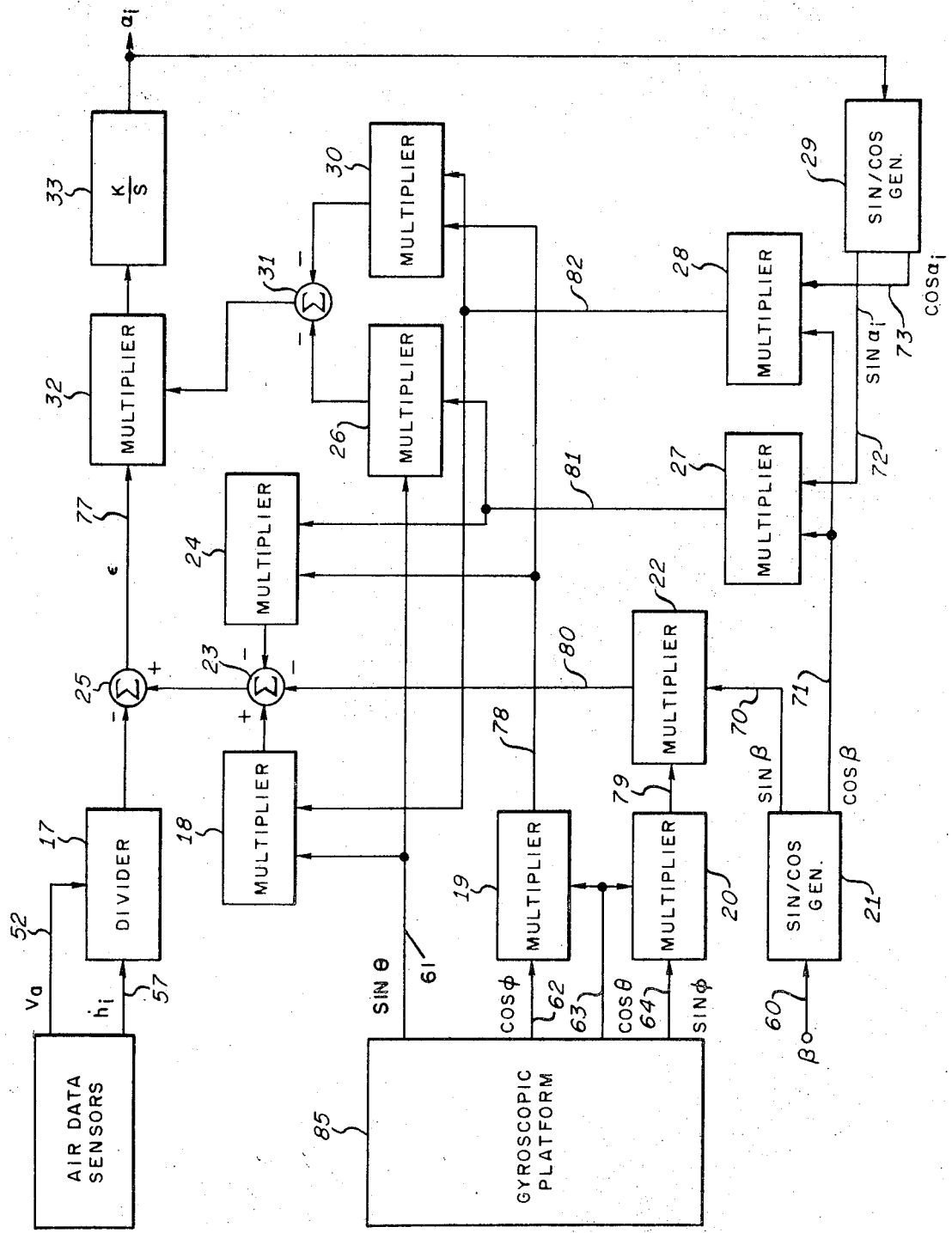

FIG. 2 illustrates another embodiment of the invention for deriving a measure of inertial angle-of-attack $\alpha_i$, this one based on Euler angle measurements as derived from a gyroscopic reference, such as a vertical gyro or preferably a Schuler tuned gyro platform that is not affected by craft accelerations.

The $\alpha_i$ computer section of FIG. 2 uses equation (10) and implicitly solves for $\alpha_i$. Equation (10) may be expressed in error signal form where the error signal $\epsilon$ on lead 77 is $$\epsilon = \cos\beta \cos\alpha_i \sin\theta - \sin\beta \cos\theta \sin\phi$$
$$- \cos\beta \sin\alpha_i \cos\theta \cos\phi - (\dot{h}_i/V_a)$$

A vertical gyro or inertial platform 85 provides signals $\sin\theta$ on lead 61, $\cos\phi$ on lead 62, $\cos\theta$ on lead 63, and $\sin\phi$ on lead 64 where $\theta$ and $\phi$ are pitch and roll axes of a vertical gyro or platform 85 which synchro signals may be converted to sin/cos format by Scott T transformers (not shown).

The term $\cos\phi \cos\theta$ on lead 78 is formed in multiplier 19 and the term $\sin\phi \cos\theta$ on lead 79 is formed in multiplier 20. $\sin\beta$ on lead 70 and $\cos\beta$ on 71 are formed in sin/cos generator 21 which may be the same as generator 8 of FIG. 1A. The output of multiplier 20 is in turn multiplied by $\sin\beta$ in multiplier 22 to form an output signal on lead 80 representing the product $\sin\beta \sin\phi \cos\theta$.

The terms including $\alpha_i$ are derived in exactly the same manner as in FIG. 1A. $\cos\beta$ on lead 71 is multiplied by $\sin\alpha_i$ on lead 81 to form a signal representative of $\cos\beta \sin\alpha_i$ and $\cos\beta$ on lead 71 is multiplied by $\cos\alpha_i$ on lead 73 in multiplier 28 to form $\cos\beta \cos\alpha_i$ on lead 82. This product signal is multiplied by $\sin\theta$ on lead 61 in multiplier 18 and input to summer 23, from which two signals are subtracted; the signals on lead 80 which is proportional to $\sin\beta \sin\phi \cos\theta$ and the output of multiplier 24 which is proportional and the product of $\cos\phi \cos\theta$ on lead 78 and $\cos\beta \sin\alpha_i$ on lead 81.

The output of divider 17 is proportional to $\dot{h}_i/V_a$, where $\dot{h}_i$ on lead 57 and $V_a$ on lead 52 are proportional respectively to altitude rate and airspeed as derived from air data computer system 52'. The quotient, which is proportional to the direction of the relative wind, is subtracted from the output of summer 23 in summer 25 to form error signal $\epsilon$ on lead 77.

As in FIG. 1A, the implicit computation method is used. The required derivative is:

$$\partial \epsilon/\partial \alpha_i = -\cos\beta \sin\alpha_i \sin\theta - \cos\beta \cos\alpha_i \cos\theta \cos\phi.$$

This derivative is formed at summer 31 and multiplied by the error signal $\epsilon$ in multiplier 32. The inputs to summer 31 are the outputs of multiplier 26 proportional to $\sin\theta \cos\beta \sin\alpha_i$ and multiplier 30 proportional to $\cos\phi \cos\theta \cos\beta \cos\alpha_i$ as indicated. The product of $\partial\epsilon/\partial\alpha_i$ is integrated in integrator 33 which yields the inertial measure of $\alpha_i$. This signal is then fed back through sin/cos generator 29 to close the feedback loop.

In most practical applications where aircraft turns are normally well coordinated, the long term value of sideslip angle $\beta$ is negligible. In such case the computation of $\alpha_i$ and hence the computers of FIG. 1A and FIG. 2 may be greatly simplified since the requirements for multipliers 5, 6, and 7 in FIG. 1A and multipliers 22, 27, and 28 in FIG. 2 may be eliminated.

As previously mentioned, the computations required for determining the measures of inertial angle-of-attack $\alpha_i$, the aircraft mass, $m$, and the true angle-of-attack $\alpha$ may be accomplished by either analog or digital computer techniques. If analog techniques are employed, separate computer apparatus will be required to determine the values of $\alpha_i$, $m$ and $\alpha$ since the final value of $\alpha$ is dependent upon the value of $m$ which in turn is dependent upon the value of $\alpha_i$. On the other hand, if digital techniques are employed, a single general purpose digital computer is all that is required, which computer may be successively programmed to compute the values $\alpha_i$ and $m$ and the final value of $\alpha$ on a time share basis; i.e., although but a single physical computer, the digital computer essentially comprises a plurality of computers depending upon the computation being programmed. Both of these techniques are well known in the art and it will be understood that either technique may be employed in interpreting the true scope and spirit of the inventive concept herein disclosed.

We claim:

1. Apparatus for providing a measure of the angle-of-attack of an aircraft comprising:
    a. means for providing a first measure of the angle-of-attack of the aircraft,
    b. means responsive to said first angle-of-attack measure for providing a measure of the mass of the aircraft, and
    c. means responsive to said mass measure for providing a final measure of the angle-of-attack of the aircraft.

2. The apparatus as set forth in claim 1 wherein said first angle-of-attack measuring means comprises computer means responsive to inertial and air data measures for providing a long term measure of craft angle-of-attack.

3. The apparatus as set forth in claim 2 wherein said inertial measure is derived from accelerometer means responsive to acceleration of said aircraft along at least the longitudinal and vertical axes thereof.

4. The apparatus as set forth in claim 3 further including accelerometer means responsive to acceleration along the lateral axis of said aircraft.

5. The apparatus as set forth in claim 2 wherein said air data measures are derived from means responsive to the altitude rate and airspeed of said aircraft.

6. The apparatus as set forth in claim 2 wherein said inertial measure is derived from gyroscopic means responsive to the angular orientation of said aircraft axes relative to earth axes.

7. The apparatus as set forth in claim 1 wherein said means for providing a measure of the mass of said aircraft comprises computer means responsive to measures of the total acceleration acting along the vertical axis of the aircraft, said first angle-of-attack measure and to measures of aircraft parameters influencing the resultant force acting along the vertical axis of said aircraft.

8. The apparatus as set forth in claim 7 further including air data sensor means responsive to air density and craft airspeed for providing said measures proportional to said parameters.

9. The apparatus as set forth in claim 7 further including means responsive to the position of control surfaces of said aircraft for modifying said first angle-of-attack measure.

10. The apparatus as set forth in claim 1 wherein said means for providing said final angle-of-attack measure comprises computer means responsive to measures of the total acceleration acting along the vertical axis of the craft, aircraft parameters influencing the resultant force acting along the vertical axis of the craft and said measure of mass.

11. The apparatus as set forth in claim 10 further including air data sensor means responsive to air density and craft airspeed for providing said measures of said parameters.

12. The apparatus as set forth in claim 10 further including means responsive to the position of control surfaces of said aircraft for modifying said final angle-of-attack measure.

13. A method of determining the angle-of-attack of an aircraft comprising the steps of:

a. measuring a first value of the angle-of-attack of the aircraft in terms of the orientation of the aircraft relative to the earth, b. measuring a value of the mass of the aircraft in terms of the total forces acting along the vertical axis of the aircraft and including said first angle-of-attack value, and finally c. measuring a value of the final angle-of-attack of the aircraft in terms of said total force and said mass values.

* * * * *